United States Patent
Wergeland et al.

(10) Patent No.: US 6,792,148 B1
(45) Date of Patent: Sep. 14, 2004

(54) METHOD AND APPARATUS FOR PROVIDING A CAMERA ACCESSORY WITH COMPRESSION

(75) Inventors: Sofie Wergeland, Löddeköpinge (SE); Ivan Medved, Lund (SE); Henrik Bengtsson, Lund (SE); Ola Lennartsson, Lund (SE); Kjell Gustafsson, Lund (SE); Torsten Carlsson, Lund (SE); Magnus Hollström, Lund (SE); Anders Linge, Kävlinge (SE); Magnus Tillgren, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 545 days.

(21) Appl. No.: 09/680,287

(22) Filed: Oct. 6, 2000

Related U.S. Application Data

(60) Provisional application No. 60/159,644, filed on Oct. 18, 1999.

(51) Int. Cl.[7] .................................................. G06K 9/36
(52) U.S. Cl. ..................................... 382/232; 345/211.8
(58) Field of Search ............................... 382/232, 307, 382/312; 348/211.8, 211.14, 143, 148, 153; 379/88.13, 93.08; 455/39, 40, 41.2, 72, 95, 97, 98, 99, 285, 408, 419, 456.6, 554.1; 901/46; 340/539.25; 342/1, 179, 185, 409; 725/117

(56) References Cited

U.S. PATENT DOCUMENTS

| | | | |
|---|---|---|---|
| 4,715,059 A | 12/1987 | Cooper-Hart et al. | 348/14.14 |
| 4,985,911 A | 1/1991 | Emmons et al. | 348/14.12 |
| 5,016,107 A | 5/1991 | Sasson et al. | 348/231.1 |

(List continued on next page.)

FOREIGN PATENT DOCUMENTS

| | | | |
|---|---|---|---|
| EP | 0731589 A2 | 9/1996 | H04M/1/02 |
| GB | 2315186 A | 1/1998 | H04M/1/02 |
| WO | WO96/21173 | 7/1996 | G03B/29/00 |
| WO | WO98/10587 | 3/1998 | H04N/7/14 |

OTHER PUBLICATIONS

Kent A. Bouchard, et al., "Mobile Imagery Systems Using Commercial Tecyhnology", Proceedings of the Annual Military Communications Conference (MILCOM), US, New York, IEEE, vol. Conf. 12, Oct. 11, 1993, pp. 848–852.

(List continued on next page.)

*Primary Examiner*—Andrew W. Johns
*Assistant Examiner*—Shervin Nakhjavan
(74) *Attorney, Agent, or Firm*—Burns, Doane, Swecker & Mathis, L.L.P.

(57) ABSTRACT

A method and apparatus is described for providing a camera accessory to a wireless mobile terminal in a wireless radio-communication system. The wireless mobile terminal has an image data interface and a physical interface for detachably coupling the camera accessory thereto. One or more frames of image data is captured in the camera accessory and compressed according to one or more compression formats. The captured and compressed frames are transferred to the wireless mobile terminal over the image data interface. The camera accessory does not include a display. Image data is captured in a predetermined format including a CIF format. Still image frames are compressed using a JPEG format and an image stream is compressed using an MPEG format. The captured and compressed frames are transferred to the wireless mobile terminal over the image data interface using respective predetermined formats including RGB CIF, YUV CIF, JPEG, MPEG, and MPEG-4 with CIF to QCIF conversion format. The image data interface includes a wired interface and wherein the camera accessory derives a power supply from the wireless mobile terminal or includes a wireless interface.

52 Claims, 2 Drawing Sheets

U.S. PATENT DOCUMENTS

| | | | |
|---|---|---|---|
| 5,027,214 A | 6/1991 | Fujimori | 348/231.7 |
| 5,042,061 A | 8/1991 | Kaneko et al. | 348/14.14 |
| 5,491,507 A | 2/1996 | Umezawa et al. | 348/14.02 |
| 5,550,754 A | 8/1996 | McNelley et al. | 348/14.01 |
| 5,568,205 A * | 10/1996 | Hurwitz | 348/723 |
| 5,611,038 A * | 3/1997 | Shaw et al. | 715/500.1 |
| 5,768,533 A * | 6/1998 | Ran | 709/247 |
| 5,825,408 A | 10/1998 | Yuyama et al. | 348/14.01 |
| 5,893,037 A | 4/1999 | Reele et al. | 455/556.1 |
| 5,966,643 A | 10/1999 | Radley | 455/74.1 |
| 6,031,582 A * | 2/2000 | Nishikawa et al. | 348/699 |
| 6,198,849 B1 * | 3/2001 | Fischer et al. | 382/232 |
| 6,211,903 B1 * | 4/2001 | Bullister | 348/14.16 |
| 6,285,471 B1 * | 9/2001 | Pornbacher | 358/479 |
| 6,480,541 B1 * | 11/2002 | Girod et al. | 375/240.12 |
| 6,525,780 B1 * | 2/2003 | Bruno et al. | 348/578 |

OTHER PUBLICATIONS

Wenwu Zhu, et al., "CIF–to–QCIF Video Bitstream Down-Conversion in the DCT Domain," Bell Labs Technical Journal, US, Bell Laboratories, vol. 3, No. 3, Jul. 1, 1998, pp. 21–29.

John Beck, et al., "An Object Based Architecture for a Digital Compression Camera," Digest of Papers of the Computer Society Computer Conference (Spring) Compcon, US, Los Alamitos, IEEE Comp. Soc. Press, vol. Conf. 40, Mar. 5, 1995, pp. 179–185.

* cited by examiner

METHOD AND APPARATUS FOR PROVIDING A CAMERA ACCESSORY WITH COMPRESSION

CROSS REFERENCE TO RELATED APPLICATION

This application claims the benefit of U.S. Provisional Application Ser. No. 60/159,644, filed Oct. 18, 1999.

BACKGROUND

The present invention relates to wireless communications. In particular, the present invention relates to a camera accessory for use with a mobile station in a wireless radiocommunication system.

The ability to conduct a telephone conversation while providing the participants with the ability to view each other is now and has been unquestionably desirable in a wide variety of situations. Advances in wireless telecommunications has made video phone communications more plausible as bandwidth increases and users demand an increasing array of features.

Prior art video phone technology exists, but has generally required expensive equipment and has required channels with wider than normal bandwidth. Providing video phone capabilities over standard telephone channels remains challenging due to the large amount of data generated by a typical image data channel. In order to provide realistic full motion live digital video, for example, it is generally accepted that at least 30 frames per second or the equivalent thereof be transmitted. A single uncompressed digital image having a typical frame size of 640×480 pixels and 3 colors components per pixel, e.g. RGB, requires a capability to process approximately 1 Megabyte of data per frame or roughly 30 Megabytes of data per second. Some systems use intraframe and interframe compression schemes to reduce the amount of data generated while preserving an effective 30 frames per second however, such systems often rely on motion based compression and are compromised when motion becomes excessive. In addition, such systems are often completely integrated and cannot interface with, for example, an external camera device.

Meanwhile, advances in modern digital cameras yields cameras equipped with extensive processing capabilities, capable of providing high quality high resolution digital images. Such cameras are typically equipped with high resolution color LCD displays, image processing circuitry and the like. However problems arise when expensive features associated with high end digital cameras are not needed, as when operating as an accessory in a telephonic system.

On the other end of the spectrum, a wide variety of simple CCD cameras exist which generate a raw video signal and may contain basic image processing such as, for example, frame grabbing or the like but fail to contain any further processing. One of the primary disadvantages associated with this type of system is that the processing required for practical image transfer on a limited channel resource, e.g. compression, encoding, decoding must be performed by the mobile terminal. Especially troublesome from a cost standpoint is the prospect of making the processing power available in the mobile terminal but having it remain unused if the user does not elect to use a camera.

In anticipation of an ever increasing demand for image transfer capabilities in the telephone network, some important standards have emerged. For example, the International Telecommunications Union (ITU) has developed a Common Intermediate Format (CIF) for image transfer as an optional part of the ITU-T's H.261 and H.263 standards. CIF specifies 288 non-interlaced luminance lines, containing 352 pixels. CIF specifies frame rates of 7.5, 10, 15, or 30 per second. When providing CIF compliant video, the number of resulting bits cannot exceed 256 K bits (where K equals 1024). The following table provides a summary:

| Videoconferencing Picture Format | Image resolution In Pixels | H.261 | H.263 |
|---|---|---|---|
| SQCIF (Sub-QCIF) | 128 × 96 | N/A | Required |
| QCIF | 176 × 44 | Required | Required |
| CIF | 352 × 288 | Optional | Optional |
| 4CIF | 702 × 576 | N/A | Optional |

It should be noted that the ITU has been in existence since the 1800s and originated to standardize telegraphic communications and had traditionally be concerned with wired communications. Accordingly, the above standards were developed to facilitate the transfer of images over wired networks.

Modern wireless mobile terminals on the other hand are presently equipped with an increasing array of features and are incorporating better display technology to facilitate, for example, Internet accessibility. Simultaneously, as the ability to conduct, for example, video conferencing is enhanced by the emergence of the wireless Internet, no satisfactory prior art system is availably to allow widespread video conferencing or still image transfer from, for example, a mobile terminal.

Problems arise in that systems which provide video conferencing are generally expensive or fail to provide easy integration with existing mobile terminal hardware. In addition, such systems are bulky and diminish the portability related advantages provided by ever decreasing form factors associated with modern mobile terminals. Such a system is described in U.S. Pat. No. 5,550,754 to McNelley, et al. Therein a teleconferencing camcorder or telecamcorder is described wherein a video camera can produce images which can be recorded on a video tape or provided in a videoconferencing mode. The device can connect with a network and can display images on a built in display. McNelly's device however suffers drawbacks including bulkiness and an abundance of features which are unnecessary. McNelly's system further fails to fully develop compression concepts which are essential to modern digital image and video processing.

In U.S. Pat. No. 5,491,507 to Umezawa et al, video telephone equipment is described wherein a user may transmit and receive pictures and speech from a unit which can be held in one hand. A camera is permanently mounted to the casing which camera can alter its angle. However, Umezawa is directed primarily to packaging and fails to disclose detailed features, such as compression, involving the operation of the video telephone in a wireless radiocommunication system.

In still other systems, such as that described in Yuyama et al, where a portable compact imaging and displaying apparatus is provided, many features are integrated into a single unit or apparatus raising the costs associated with the unit. In addition, drawbacks exist in that it is not possible to use the camera section as an accessory and further limitations exist in providing, for example, compression features sufficient to allow ultimate transfer in a wireless radiocommunication system. Instead, Yuyama et al described how images may be transferred over a telephone line after establishing a connection using a conventional POTS style off-hook and connection sequence.

Thus, it can be seen that while digital cameras and even videophones exist and may be exploitable for teleconferencing and the like, the difficulty posed by, for example, providing a camera accessory to a mobile terminal in a wireless radiocommunication system remains unaddressed.

It would be appreciated in the art therefore for a method and apparatus for providing a camera accessory for a mobile terminal in a wireless radiocommunication system. Such a system could provide still and live motion video images over an air interface without the need for expensive digital cameras or videoconferencing systems.

It would further be appreciated in the art for a method and apparatus which would provide, for example, the ability to provide a camera accessory which would not require expensive display or battery technology.

SUMMARY

To fulfill the needs of the art, a method and apparatus for providing a camera accessory including compression is described.

Thus in accordance with various exemplary embodiments of the present invention, a camera accessory is provided which camera accessory may be detachably coupled to a wireless mobile terminal associated with a wireless radiocommunication system. Such a detachable coupling may be by various means, such as, for example, mechanical attachments as will be described in greater detail hereinafter. The wireless mobile terminal may further include an image data interface and, as described, a physical or mechanical interface for detachably coupling the camera accessory thereto. Accordingly, one or more frames of image data may be captured in the camera accessory, for example, under control of the mobile terminal and thereafter compressed in the camera accessory, for example, by a compression block associated with a processor or the like, according to one or more compression formats. The captured frames and the compressed frames may be transferred to the wireless mobile terminal over the image data interface such that, for example, compressed image frames may be transferred further over an air interface while captured image frames may be displayed locally on the display associated with the mobile terminal. It should be noted that in order to reduce costs to the lowest possible level in accordance with the objective of the present invention, the camera accessory does not include a display.

In accordance with other exemplary embodiments of the present invention, the image data is captured in a predetermined format including, for example, a CIF format such as previously described, i.e. in a 352×288 pixel uncompressed format. The captured one or more frames may include a still image frame and accordingly, the one or more compression formats may includes a JPEG compression format for still image compression. JPEG compression preferably provides around a 25:1 compression ratio. The captured one or more frames may further include a stream of image frames and thus, the one or more compression formats includes an MPEG format. The captured one or more frames and the compressed one or more frames may further be transferred in one or more respective predetermined formats to the wireless mobile terminal over the image data interface. The one or more respective predetermined formats may includes, for example, an RGB CIF format, an YUV CIF format, a JPEG format, a MPEG format, and a MPEG-4 with CIF to QCIF conversion format. It should be noted that both compressed and uncompressed (CIF) image data may be transferred to the wireless mobile terminal, however, for transmission over an air interface, compressed data is preferable. It should further be noted that the image data interface may be a wired interface in which case the camera accessory derives power from a power supply located, for example, in wireless mobile terminal or may be a wireless interface in which case the camera accessory may be powered by a battery or the like or may derive power from an alternate source.

BRIEF DESCRIPTION OF THE DRAWINGS

The objects and advantages of the invention will be understood by reading the following detailed description in conjunction with the drawings, in which.

DETAILED DESCRIPTION

Figure 1:
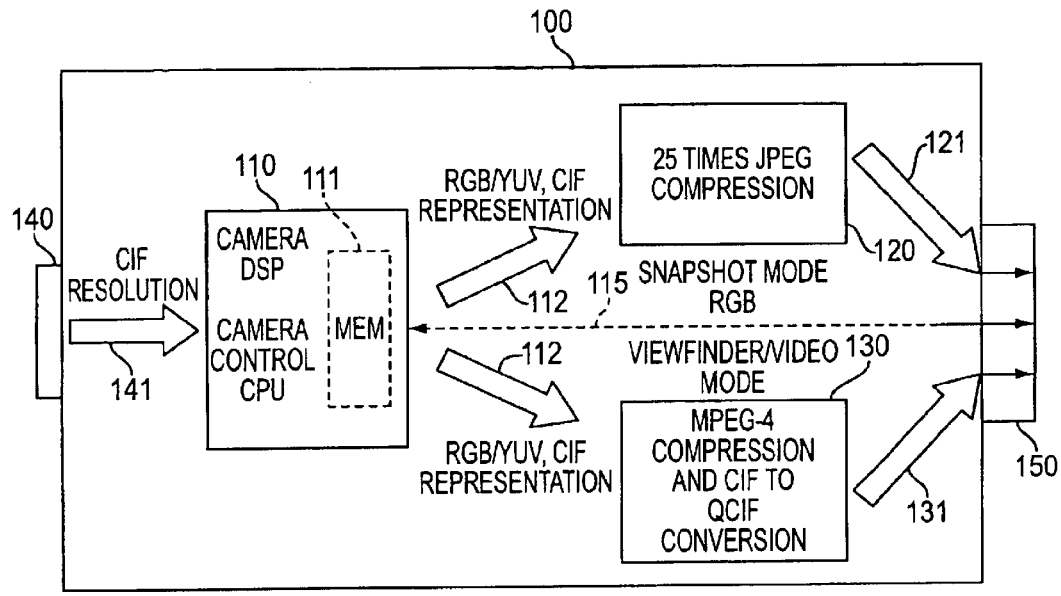
FIG. 1 is a block diagram illustrating an exemplary camera accessory in accordance with the present invention.

The various features of the invention will now be described with reference to the figures, in which like parts are identified with the same reference characters.

Thus in accordance with various exemplary embodiments of the present invention, camera accessory 100 as illustrated in FIG. 1 is shown having, for example, processor 110, which may include a quantity of resident memory 111, JPEG compression module 120, MPEG compression module 130, image data interface 140, and output interface 150. It is important to note that in accordance with various exemplary embodiments of the present invention camera accessory 100 is not provided with a display unit thus saving costs while providing, for example, signal processing functions such as compression.

Image data interface may be provided with data from a camera of a kind known in the art such as for example, a CCD camera which is capable of generating image data at a CIF resolution to image data interface 140. Image data 141, at CIF resolution, may be input to processor 110 which may provide, for example, Digital Signal Processing (DSP) functions on image data 140 and may further provide camera control functions. DSP functions provided may include conventional image processing functions or additional functions which may be desirable such as, for example, format conversion, decimation, smoothing, interpolation, transformation, or any of the like image processing functions which are widely known. Processed data 112 which may be output from processor 110 in a known format such as, for example, RGB or YUV format may be input for compression in exemplary JPEG compression module 120 or exemplary MPEG module 130 or additional compression modules as may be required or as may become available. It should be noted that in accordance with various exemplary embodiments of the present invention, JPEG compression module 120 may provide preferably 25 times compression in accordance with conventional JPEG compression standards although other JPEG standards may emerge and be implemented therein. MPEG compression module 130 may preferably implement MPEG-4 compression and may further provide, for example, CIF to QCIF conversion to provided even greater degrees of compression for, for example, live motion video transmission. It should further be noted that in accordance with various exemplary embodiments of the present invention, an additional direct feed of image data may be provided as line data 115 for various modes including a "snapshot" mode and/or a viewfinder/live video mode.

Figure 2:
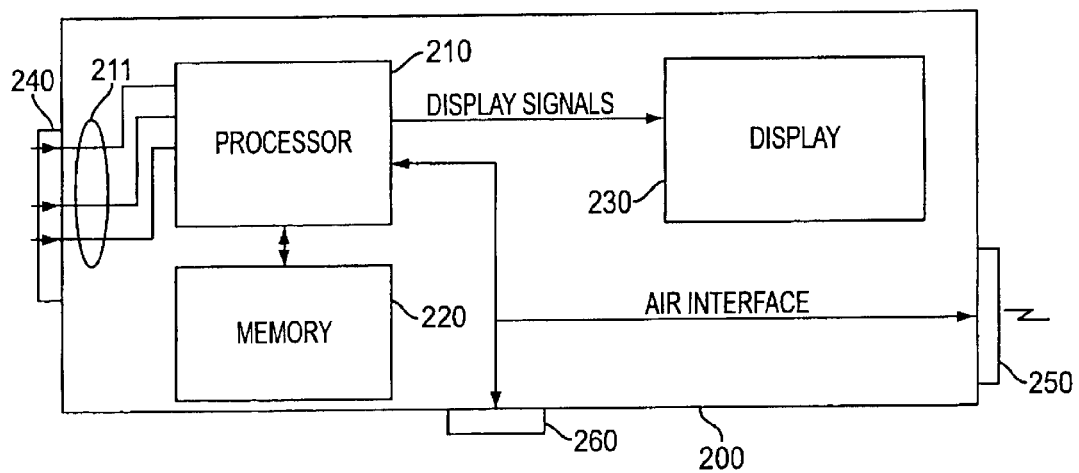
FIG. 2 is a block diagram illustrating components of an exemplary wireless mobile terminal in accordance with exemplary embodiments of the present invention.

Accordingly, JPEG compressed image data 121, MPEG compressed image data 131, and line data 115 may be output to interface 150 which may be a wired interface to, for example, a mobile terminal through a connector, or may be a wireless connection to a mobile terminal including, but not limited to, an infrared link, a piconet link, an optical link, an RF link, and the like. It should be noted that it is further possible couple image data signals from interface 150 to a mobile wireless terminal through a Bluetooth link. Interface 150 may be used to couple compressed image data signals or line signals to, for example, mobile terminal 200 as illustrated in FIG. 2.

Thus JPEG compressed image data 121, MPEG compressed signals and line signals may be received at interface 240 of mobile terminal 200 which, again, may be a connector for a wired link or may be a complimentary link for, for example, an infrared link, a piconet link, an optical link, an RF link, a Bluetooth link or the like. Data may be transferred on lines 211 to processor 210 and may be displayed on display 230, stored in memory 220, for example, to be recalled at a later time by processor 210 under the command of a software application or may simply be stored until an entire image is processed and/or decoded. Alternately, image data may be transferred in a compressed or decompressed form over air interface 250 or interface 260 to another mobile terminal for display or to another system for display. It should be noted that interface 260 may further include a wired connection or a wireless connection such as, for example, an infrared link, an RF link, a piconet link, a Bluetooth link, or the like as described herein above with reference to interface 150.

Figure 3A:
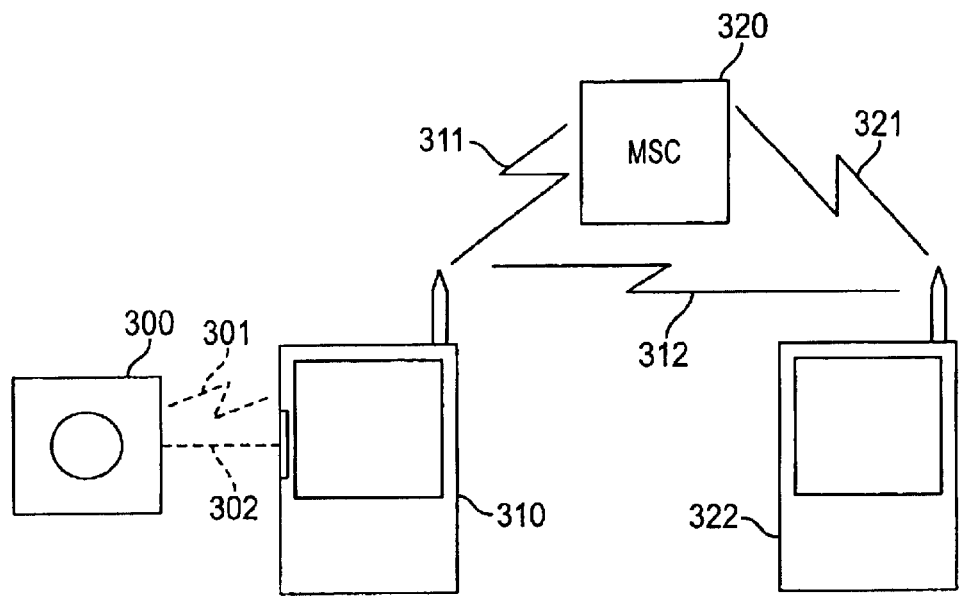
FIG. 3A is a diagram illustrating exemplary system configurations in accordance with various exemplary embodiments of the present invention.
Figure 3B:
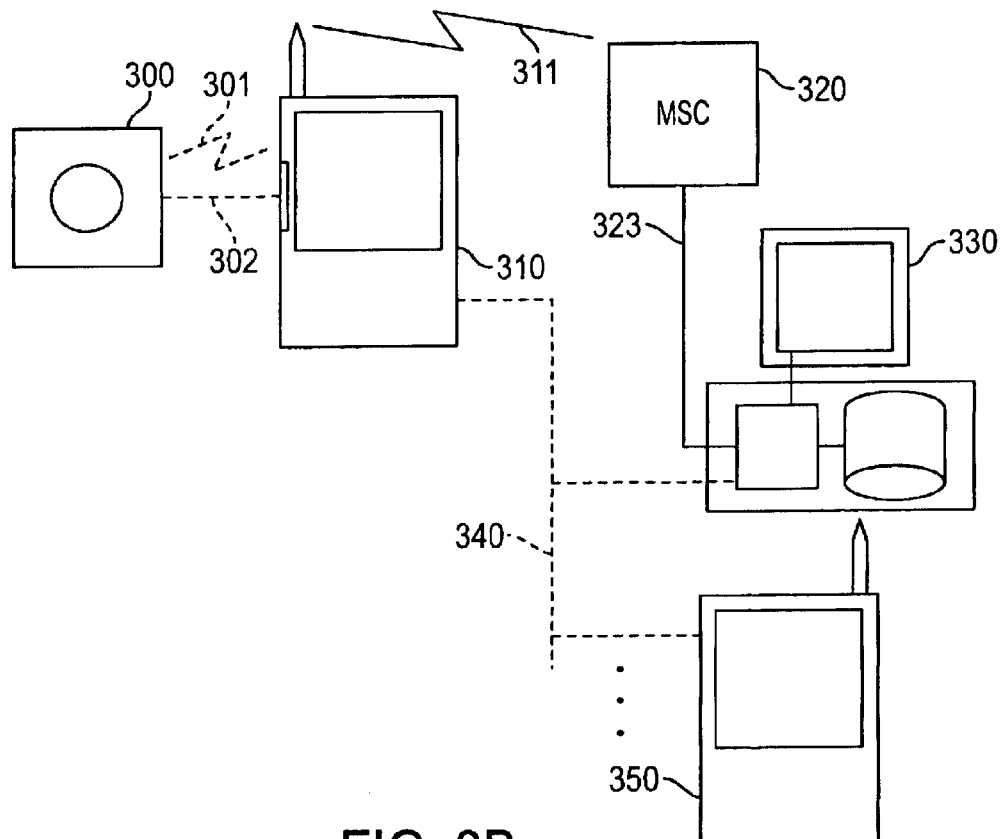
FIG. 3B is a diagram further illustrating exemplary system configurations in accordance with various exemplary embodiments of the present invention.

As can be seen in FIG. 3A, camera accessory 300 may be coupled to, for example, mobile wireless terminal 310 over wired link 301 or wireless link 302. Image data may then be displayed locally on a display associated with mobile wireless terminal 310 and/or transmitted over air interface 311, for example, to MSC 320 and eventually to a additional mobile terminal 322 over air interface 321. In accordance with various exemplary embodiments, image data may be transferred directly to compatible devices such as, for example, additional mobile wireless terminal 322 over a direct local wireless link such as link 312 which may be, for example, a Bluetooth link. It should be noted that while link 312 is illustrated connecting mobile wireless terminal 310 to additional mobile wireless terminal 322, link 312 may also connect to any compatible device such as, for example, a printer, remote system such as a desktop system, or the like. FIG. 3B illustrates that image data may also be transferred to, for example, remote system 330 which may be a desktop system or the like, either through air interface 311 and link 323 or may be connected directly through link 340 which may be, for example, a wired link. Link 340 may also be used to connect directly to additional mobile wireless terminal 350.

It will be appreciated by those skilled in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description and all changes that come within the meaning and range of equivalents thereof are indicated to be embraced therein.

What is claimed is:

1. A method operating a camera accessory associated with a wireless mobile terminal, the wireless mobile terminal associated with a wireless radiocommunication system, the wireless mobile terminal having an image data interface and a physical interface for detachably coupling the camera accessory thereto, the method comprising the steps of:

coupling the camera accessory to the wireless mobile terminal using the physical interface;

capturing one or more frames of image data in the camera accessory;

compressing the one or more frames of image data in the camera accessory according to one or more compression formats; and transferring the captured one or more frames and the compressed one or more frames to the wireless mobile terminal over the image data interface;

wherein the camera accessory does not include a display.

2. The method of claim 1, wherein the image data is captured in a predetermined format.

3. The method of claim 2, wherein the predetermined format includes a CIF format.

4. The method of claim 1, wherein the one or more frames includes a still image frame and wherein the one or more compression formats includes a JPEG format.

5. The method of claim 1, wherein the one or more frames includes a stream of image frames and wherein the one or more compression formats includes an MPEG format.

6. The method of claim 1, wherein the step of transferring further includes transferring the captured one or more frames and the compressed one or more frames in one or more respective predetermined formats to the wireless mobile terminal over the image data interface.

7. The method of claim 6, wherein the one or more respective predetermined formats includes an RGB CIF format.

8. The method of claim 6, wherein the one or more respective predetermined formats includes an YUV CIF format.

9. The method of claim 6, wherein the one or more respective predetermined formats includes a JPEG format.

10. The method of claim 6, wherein the one or more respective predetermined formats includes a MPEG format.

11. The method of claim 6, wherein the one or more respective predetermined formats includes a MPEG-4 with CIF to QCIF conversion format.

12. The method of claim 1, wherein the image data interface is a wired interface and wherein the camera accessory derives a power supply from the wireless mobile terminal.

13. The method of claim 1, wherein the image data interface is a wireless interface.

14. An apparatus for providing image data in a wireless radiocommunication system, the apparatus comprising:

a wireless mobile terminal associated with the wireless radiocommunication system, the wireless mobile terminal having an image data interface and a physical interface; and a camera accessory detachably coupled to the physical interface of the wireless mobile terminal, the camera accessory for providing one or more frames of image data to the wireless mobile terminal, the camera accessory configured to:
  capture one or more frames of image data in the camera accessory;
  compress the one or more frames of image data in the camera accessory according to one or more compression formats; and
  transfer the captured one or more frames and the compressed one or more frames to the wireless mobile terminal over the image data interface;
wherein the camera accessory does not include a display.

15. The apparatus of claim 14, wherein the camera accessory, in capturing, is further configured to capture the image data in a predetermined format.

16. The apparatus of claim 15, wherein the predetermined format includes a CIF format.

17. The apparatus of claim 14, wherein the one or more frames includes a still image frame and wherein the one or more compression formats includes a JPEG format.

18. The apparatus of claim 14, wherein the one or more frames includes a stream of image frames and wherein the one or more compression formats includes an MPEG format.

19. The apparatus of claim 14, wherein the camera accessory, in transferring is further configured to transfer the captured one or more frames and the compressed one or more frames in one or more respective predetermined formats to the wireless mobile terminal over the image data interface.

20. The apparatus of claim 19, wherein the one or more respective predetermined formats includes an RGB CIF format.

21. The apparatus of claim 19, wherein the one or more respective predetermined formats includes an YUV CIF format.

22. The apparatus of claim 19, wherein the one or more respective predetermined formats includes a JPEG format.

23. The apparatus of claim 19, wherein the one or more respective predetermined formats includes a MPEG format.

24. The apparatus of claim 19, wherein the one or more respective predetermined formats includes a MPEG-4 with CIF to QCIF conversion format.

25. The apparatus of claim 19, wherein the image data interface includes a wired interface and wherein the camera accessory derives a power supply from the wireless mobile terminal through the wired interface.

26. The apparatus of claim 14, wherein the image data interface includes a wireless interface.

27. A camera accessory for providing image display and image transfer on a wireless mobile terminal in a wireless radiocommunication system, the camera accessory separate and detachably coupled to the wireless mobile terminal, the camera accessory comprising:
  an image sensor for generating a continuous stream of image frames at a predetermined resolution;
  a physical interface for detachably coupling the camera accessory from the wireless mobile terminal;
  a data interface coupled to the wireless mobile terminal; and
  a processor, the processor coupled to the image sensor and the data interface the processor configured to:
    capture one or more image frame from the continuous stream of image frames at the predetermined resolution;
    compress the one or more captured frames according to one or more compression formats; and
    transfer the captured one or more frames and the compressed one or more frames to the wireless mobile terminal over the image data interface;
wherein the camera accessory does not include a display.

28. The camera accessory of claim 27, wherein the camera accessory, in capturing, is further configured to capture the image data in a predetermined format.

29. The camera accessory of claim 28, wherein the predetermined format includes a CIF format.

30. The camera accessory of claim 27, wherein the one or more frames includes a still image frame and wherein the one or more compression formats includes a JPEG format.

31. The camera accessory of claim 27, wherein the one or more frames includes a stream of image frames and wherein the one or more compression formats includes an MPEG format.

32. The camera accessory of claim 27, wherein the camera accessory, in transferring is further configured to transfer the captured one or more frames and the compressed one or more frames in one or more respective predetermined formats to the wireless mobile terminal over the image data interface.

33. The camera accessory of claim 32, wherein the one or more respective predetermined formats includes an RGB CIF format.

34. The camera accessory of claim 32, wherein the one or more respective predetermined formats includes an YUV CIF format.

35. The camera accessory of claim 32, wherein the one or more respective predetermined formats includes a JPEG format.

36. The camera accessory of claim 32, wherein the one or more respective predetermined formats includes a MPBG format.

37. The camera accessory of claim 32, wherein the one or more respective predetermined formats includes a MPEG-4 with CIF to QCIF conversion format.

38. The camera accessory of claim 32, wherein the image data interface includes a wired interface and wherein the camera accessory derives a power supply from the wireless mobile terminal through the wired interface.

39. The camera accessory of claim 27, wherein the image data interface includes a wireless interface.

40. A video camera accessory for use with a wireless mobile terminal in a wireless radiocommunication system, the video camera accessory comprising:
  an optics unit for receiving a light image and converting the light image into one or more electrical signals;
  an image processing unit for generating one or more processed image frames from the one or more electrical signals;
  a video compression unit for generating one or more compressed image frames from the one or more processed image frames; and
  an output unit for supplying the one or more processed image frame and the one or more compressed image frames to the wireless mobile terminal;
wherein the video camera accessory does not have a display.

41. The video camera accessory of claim 40, wherein the output unit further includes a wireless transmission unit.

42. The video camera accessory of claim 40, wherein the output unit includes a connector for making an electromechanical connection with the external device.

43. The video camera accessory of claim 40, wherein the video compression unit includes a JPEG compression unit.

44. The video camera accessory of claim 40, wherein the video compression unit includes an MPEG-4 compression unit.

45. The video camera accessory of claim 44, wherein:
the one or more processed image frame are processed according to a CIF format; and
the video compression unit further converts the CIF to QCIF conversion.

46. A method for providing images in a wireless radio-communication system having at least one wireless mobile terminal equipped with a camera accessory, a base station, and an air interface, the method comprising:
capturing one or more image frames in a predetermined format;
compressing the one or more image frames in the camera accessory using one or more compression formats; and
transferring the one or more processed image frame and the compressed one or more image frames to the wireless mobile terminal.

47. The method of claim 46, further comprising the step of displaying the transferred one or more image frames on a display associated with the at least one wireless mobile terminal.

48. The method of claim 47, further comprising the step of transferring the transferred one or more image frames to the base station over the air interface.

49. The method of claim 47, wherein the step of transferring further includes transferring the compressed one or more image frames to the wireless mobile terminal over a wireless connection between the wireless mobile terminal and the camera accessory.

50. The method of claim 46, wherein the predetermined format includes a CIF format.

51. The method of claim 46, wherein the one or more frames includes a still image frame and wherein the one or more compression formats includes a JPEG format.

52. The method of claim 46, wherein the one or more frames includes a stream of image frames and wherein the one or more compression formats includes an MPEG format.

* * * * *

UNITED STATES PATENT AND TRADEMARK OFFICE
CERTIFICATE OF CORRECTION

PATENT NO.        : 6,792,148 B1
APPLICATION NO. : 09/680287
DATED             : September 14, 2004
INVENTOR(S)      : Sofie Wergeland et al.

It is certified that error appears in the above-identified patent and that said Letters Patent is hereby corrected as shown below:

Col. 8, line 33
Claim 36, Line 2: Change "MPBG" to --MPEG--

Signed and Sealed this

Twenty-second Day of May, 2007

JON W. DUDAS
*Director of the United States Patent and Trademark Office*